Patented June 25, 1946

2,402,551

UNITED STATES PATENT OFFICE 2,402,551

METAL PROTECTIVE COATINGS

Harold S. Holt, Wilmington, Del., assignor to E. I. du Pont de Nemours & Company, Wilmington, Del., a corporation of Delaware No Drawing. Application June 15, 1943, Serial No. 490,923

4 Claims. (Cl. 106—14)

This invention relates to the art of coating, and more particularly to improved compositions for protecting metals against corrosion due to water, particularly sea water.

It is well known that lanolin has good rust-preventative properties when applied over steel. However, lanolin films have a number of objections that limit their usefulness from a practical standpoint. For example, the films are very soft, oily and sticky; consequently they are easily rubbed off on handling and they collect dirt readily. This is objectionable when accurately machined parts, for example, automobile parts, guns, engines, etc., are to be protected since the dirt or grit may interfere with the proper functioning of the parts. War time needs have magnified this problem since metal articles shipped overseas are subjected to salt-laden atmospheres which are very corrosive and which render useless many machined articles. As a result, elaborate precautions are taken to protect such articles involving the use of rust preventatives followed by numerous wrappings and impregnations of the wrappings with water-repellent materials. A corrosion-resistant film which would not accumulate dirt or grit readily would greatly simplify the protection of such parts since it would obviate the use of wrappings and would bring about a saving of time and of material needed for protection.

This invention has as an object the preparation of a new coating composition which possesses good rust-preventative properties when applied over steel. A further object is the preparation of a coating composition whose films do not collect dirt and grit and can be handled without causing rusting of the coated metal at the point of contact. A still further object is the preparation of a coating composition which can readily be removed from the coated article. Other objects will appear hereinafter.

These objects are accomplished by preparing a coating composition which comprises lanolin and a film-forming material wherein lanolin is the major non-volatile constituent of the coating composition as more fully described below.

In the preferred method of preparing the metal protective coating compositions, ethyl cellulose is used as the film-forming material. The ethyl cellulose is dissolved in a suitable solvent, for example xylene, and the lanolin is then added with stirring until solution is complete. The coating composition is applied by spraying, dipping, or brushing onto the article to be protected.

The film-forming materials which are used with the lanolin are preferably of such a character that they will mix with lanolin and produce dry films thus reducing or overcoming the stickiness which is characteristic of lanolin films. These film-forming materials, which as previously indicated are used in a ratio of lanolin to film-forming material that is greater than 1, should not be water-sensitive for otherwise the film-forming material will be leached from the coating composition on exposure to water or will permit the entrance of moisture through the film. Ethyl cellulose has these properties to a high degree. Mixtures of ethyl cellulose and lanolin when dissolved in a mutual solvent in proportions ranging, on the weight basis, from 10% ethyl cellulose and 90% lanolin to 25% ethyl cellulose and 75% lanolin as the non-volatile constituents of the coating composition possess the highly desirable properties required in a readily removable metal protective film. Films prepared from such coating compositions do not readily collect dirt and grit and can be handled without causing rusting. The ratio of ethyl cellulose to lanolin is important in obtaining the best results. If too high a ratio of ethyl cellulose is used the film is too strong and tough and tends to separate from the steel after immersion in water. If the ratio of ethyl cellulose to lanolin is too low, the film approaches lanolin in character, that is, it is too sticky and soft. The correct ratio of lanolin to ethyl cellulose in the coating composition is that which will give dry and tough films without giving sufficient tensile strength to enable the film to be stripped from the metal. It has been found that ratios of 85 to 90 parts of lanolin with 15 to 10 parts ethyl cellulose are most suitable. For some uses where a high degree of dryness of film is desirable, high proportions of ethyl cellulose can be used, the exact ratio being determined by the service conditions to be met.

The invention is further illustrated by the following example in which the parts are by weight.

Example

A lanolin-ethyl cellulose coating composition is prepared as follows: 1 part of ethyl cellulose having an ethoxy content of 48.5 to 49.5%, which corresponds to 2.50–2.58 ethoxy groups per glucose unit, and having a viscosity of 20 centipoises (5% solution in an 80:20 toluene/ethanol solvent mixture at 25° C.) is dissolved in 38.5 parts of xylene. Then 9 parts of anhydrous lanolin is added with stirring until solution is complete.

Steel panels can be coated with this solution by dipping the panels into the solution, removing the panels from the solution and removing the solvent by evaporation at room temperature. These panels when subjected to a 20% salt spray at 90° F. for over 70 hours show no evidence of corrosion, whereas unprotected steel rusts badly in 1 to 2 hours under the same conditions. The protective film exhibits sufficient adhesion to the steel panel so that after soaking in water for 19 days the panel is fully protected against corrosion. Steel panels coated in the manner described above do not collect dirt and grit readily and can be handled without causing rusting at the point of contact.

The term "lanolin" as used herein is intended to include refined anhydrous lanolin, anhydrous wool grease or the lanolin acids and lanolin alcohols obtainable from lanolin by saponification. The so-called hydrated lanolins which contain water emulsified in them are not suitable for the purposes of this invention. In general, the more highly refined the lanolin, the better the film properties of the coated articles.

The type of ethyl cellulose used is important in obtaining best results. Highly substituted ethyl celluloses are more soluble in organic solvents and are more compatible with lanolin than low substituted ethyl celluloses. Ethyl celluloses having an ethoxy content of 43.5 to 49.5% have been found to be satisfactory for the preparation of the coating composition. However, ethyl celluloses having an ethoxy content of 48.5 to 49.5% are preferred since they are more soluble in organic solvents and more compatible with lanolin.

The solids content of the rust preventive solution is important if the film is applied by dipping or brushing since most rust preventives do not provide good protection if the film thickness is too low.

Of course more dilute solutions can be used if the article is dipped or brushed several times, but in general this is uneconomical. For application by spraying the non-volatile content of the solution is not so important since the film thickness can be controlled by proper manipulation of the spray gun. Coating compositions in which the non-volatile constituents are present in concentrations ranging from 20% to 30% have been found to give films of sufficient thickness when applied by dipping. Concentrations within the range of 10 to 30% have, however, given excellent results.

With ethyl cellulose-lanolin compositions the best results are obtained with aromatic hydrocarbon solvents, such as benzene, toluene, and xylene. Ethyl cellulose and lanolin are readily soluble in solvents of this type. Chlorinated aliphatic hydrocarbons are also useful as solvents for the lanolin-ethyl cellulose mixtures. Mixtures of solvents such as obtained by mixing chlorinated hydrocarbons with aromatic hydrocarbons give excellent results. Solvent mixtures containing alcohols and ketones tend to give cloudy solutions which deposit cloudy films.

Although the most satisfactory compositions of this invention are prepared as in the foregoing example from lanolin and ethyl cellulose, film-forming materials other than ethyl cellulose, particularly the various cellulose derivatives, for example cellulose ethers such as butyl cellulose and benzyl cellulose, can be used. Useful compositions of the kind described herein can be obtained also from mixtures of lanolin with compatible polymeric or resinous materials which yield dry, substantially water insensitive films. Polymeric and resinous materials of this type are isomerized and cyclized rubber, phenol-modified rubber, chlorinated rubber, polystyrene, copolymers of vinyl chloride and vinyl acetate, polyhydric alcohol-polybasic acid resins, rosin acid glycerides, and phenol-aldehyde resins.

The protective films can be readily removed from the coated articles by rubbing, e. g., with a dry cloth, or by washing with a solvent in which the lanolin and the film-forming material are soluble.

The rust-preventive compositions of the type described are useful in protecting gun recoil mechanisms, automotive parts, such as clutch faces and gears, automobile and airplane engine parts, rifle barrels, etc. These compositions are particularly useful when used to protect junctions of dissimilar metals such as brass-steel, brass-aluminum alloy, steel-aluminum alloy, steel-zinc, etc. Such junctions are particularly susceptible to corrosion by salt water because of the galvanic or electrolytic action caused by the salt.

As many apparently widely different embodiments of this invention may be made without departing from the spirit and scope thereof, it is to be understood that I do not limit myself to the specific embodiments thereof except as defined in the appended claims.

I claim:

1. A coating composition comprising lanolin, a volatile organic solvent, and ethyl cellulose which is soluble in organic solvent and which has an ethoxy content of from 43.5% to 49.5%, the non-volatile portion of said coating composition containing the lanolin and said ethyl cellulose in the proportion by weight from 10% to 25% of the ethyl cellulose and from 90% to 75% of the lanolin.

2. A coating composition comprising lanolin and a water insensitive organic solvent soluble cellulose ether, said coating composition containing the lanolin and said cellulose ether in the proportion by weight from 10% to 25% of the cellulose ether and from 90% to 75% of the lanolin.

3. A metal-protective coating composition comprising lanolin, a water insensitive organic solvent cellulose ether, and a volatile solvent, said coating composition containing the lanolin and said cellulose ether in the proportion by weight of from 10% to 25% of the cellulose ether and from 90% to 75% of the lanolin.

4. The coating composition set forth in claim 2 wherein the cellulose ether is ethyl cellulose.

HAROLD S. HOLT.

Certificate of Correction

Patent No. 2,402,551.

June 25, 1946.

HAROLD S. HOLT

It is hereby certified that error appears in the printed specification of the above numbered patent requiring correction as follows: Column 4, line 58, claim 3, before the word "cellulose" insert *soluble*; and that the said Letters Patent should be read with this correction therein that the same may conform to the record of the case in the Patent Office.

Signed and sealed this 17th day of September, A. D. 1946.

[SEAL]

LESLIE FRAZER,
*First Assistant Commissioner of Patents.*